Nov. 11, 1958  O. W. WINTER  2,859,497
SHELL MOLDING MACHINE
Filed July 22, 1954  5 Sheets-Sheet 1

INVENTOR.
OTTO W. WINTER
BY
Bean, Brooks, Buckley & Bean.
ATTORNEYS

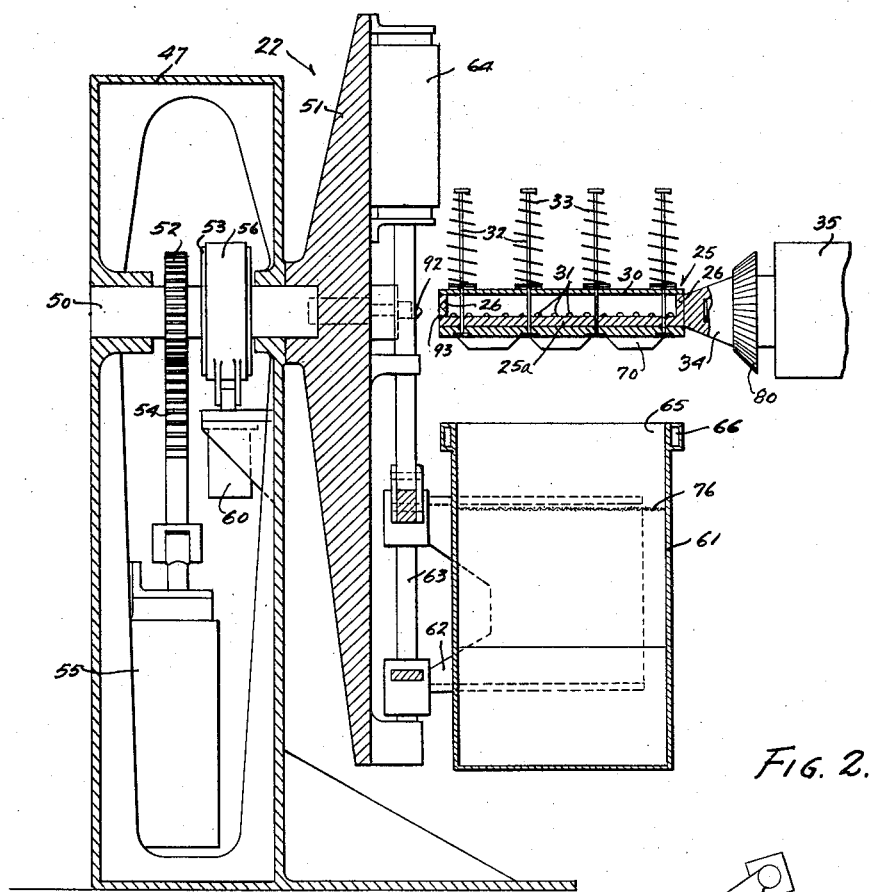
FIG. 2.
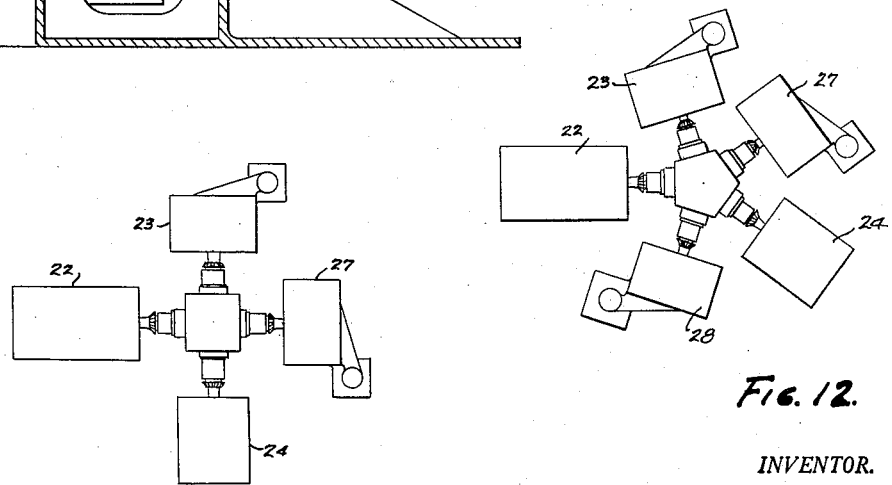
FIG. 11.
FIG. 12.
INVENTOR.
OTTO W. WINTER

Nov. 11, 1958     O. W. WINTER     2,859,497
SHELL MOLDING MACHINE
Filed July 22, 1954     5 Sheets-Sheet 3
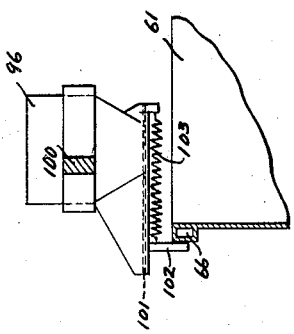
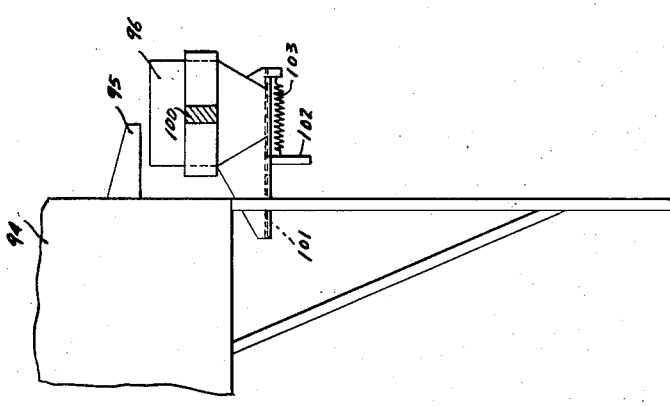
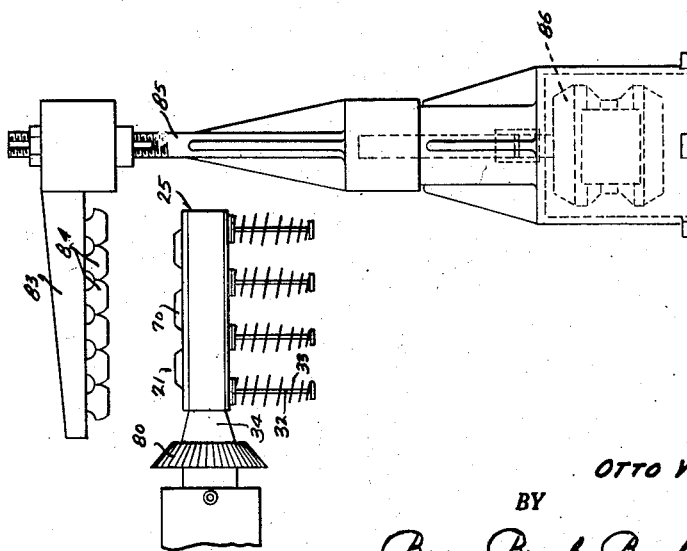
INVENTOR.
OTTO W. WINTER
BY
Bean, Brooks, Buckley & Bean.
ATTORNEYS

INVENTOR.
OTTO W. WINTER

Nov. 11, 1958     O. W. WINTER     2,859,497
SHELL MOLDING MACHINE
Filed July 22, 1954                                5 Sheets-Sheet 5
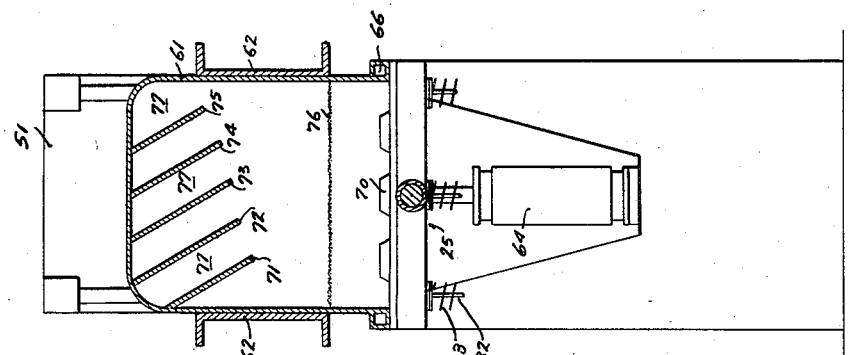
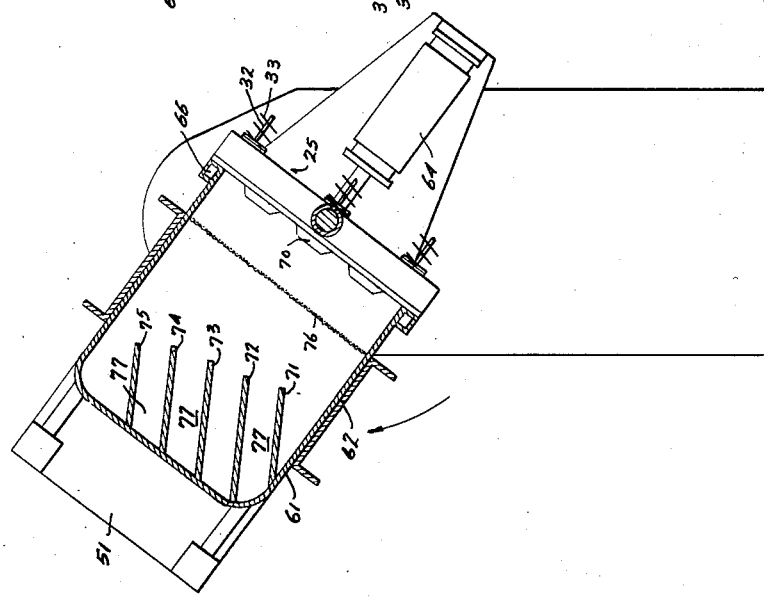
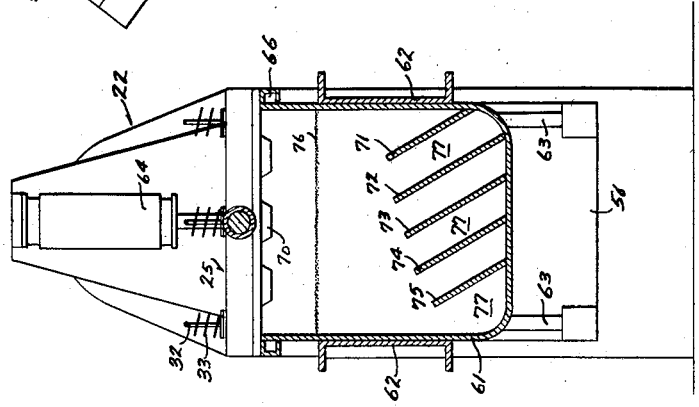
INVENTOR.
OTTO W. WINTER
BY
Bean, Brooks, Buckley & Bean
ATTORNEYS

United States Patent Office 2,859,497
Patented Nov. 11, 1958

2,859,497

SHELL MOLDING MACHINE

Otto W. Winter, Grand Island, N. Y.

Application July 22, 1954, Serial No. 444,977

13 Claims. (Cl. 22—20)

My invention relates in general to a shell molding machine for making shell molds for metal castings, and in particular to a machine for making shell molds under the so called Croning process, reference being had to my copending application, Serial No. 386,721 filed October 19, 1953.

The principal object of the present invention is to provide a machine having a turret head carrying a number of pattern assemblies movable in sequence to various stations of operation.

Another object is to provide a device of this nature having a sand box which is fixed at the molding station, the pattern assembly being movable to and from the sand box.

A further object is to provide a sand box which is vertically movable toward and into contact with a registering pattern assembly and inverted in unison with said assembly when at the molding station.

Another object is to provide means to invert the pattern assembly when it is being moved from the molding station to the curing station and from the stripping station to the molding station.

Moreover, my invention contemplates the provision of outboard supporting means for the pattern assembly while at the molding and stripping stations.

Moreover, my device is provided with a pivotally mounted heater in the curing station, whereby the heater can be moved out of active position at the end of the curing cycle, or if the molding process has been delayed or for any other reason.

The above objects and advantages have been accomplished by the device shown in the accompanying drawings; of which, Fig. 1 is a plan view of my device;

Fig. 2 is a fragmentary sectional view taken on line II—II of Fig. 1 showing the molding station;

Fig. 3 is a fragmentary end elevation of the pattern assembly in the position occupied when at the curing station;

Fig. 6 is a fragmentary side elevation of the sand mixture hopper and supply bin;

Fig. 7 is a fragmentary elevation of the mixture hopper when in discharge position;

Figs. 8 to 10 show various positions of the sand flask during the process of molding;

Fig. 11 is a diagrammatic plan view of a modified form of the invention; and,

Fig. 12 is a diagrammatic plan view of another modified form of the invention.

Figure 1:
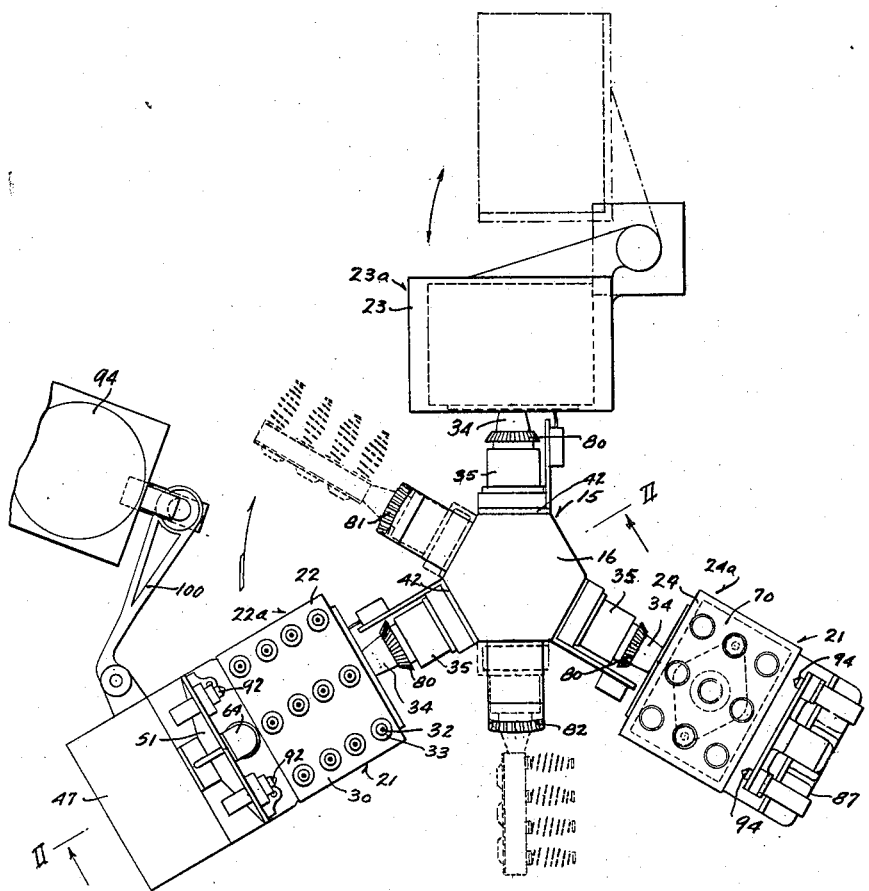
Figure 5:
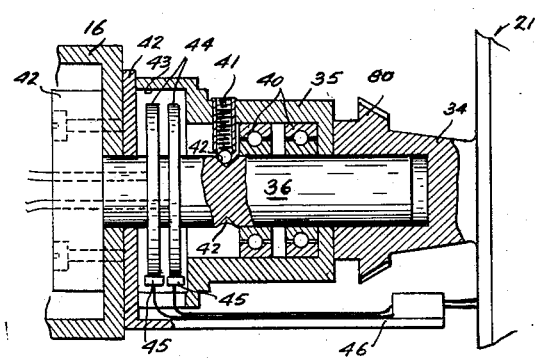
Fig. 5 is an enlarged fragmentary sectional view of the pattern assembly taken on line V—V of Fig. 4.

Referring now to the form of invention shown in Figs. 1-10, inclusive, my device consists of a centrally arranged pedestal 15 which rotatably supports a turret head 16. The turret head carries a number of spaced pattern assemblies 21 and the head is rotated to bring the assemblies to the various stations by any suitable means such as the motor 20 shown in dotted lines in Fig. 4. Well known index means (not shown) are employed to cause the turret head to be indexed to carry the pattern assemblies to the various stations and to hold them at such stations for predetermined time intervals. Since the index means and the circuits controlling the means are not a part of my invention they are not shown or described herein.

In general, my device consists of a molding unit 22 located at the molding station 22a; a heating unit 23 disposed at the curing station 23a; and a stripping unit 24 located at the stripping station 24a. In carrying out the shell molding process by means of the device shown herein, a suitable mixture of sand and a resin is sprinkled on the pattern 70 at the molding station 22 after which the pattern assemblies are indexed so as to bring the first pattern assembly into the curing station 23 where the mold is cured, and then such pattern assembly is moved to the stripping station 24 where the finished shell mold is stripped from the pattern which is then ready to again form a mold when it is indexed to the molding station 22.

As shown in Fig. 1, three pattern assemblies 21 are used in the preferred form of the device, each simultaneously occupying one of the stations. Each pattern assembly comprises a pattern support 25 which may consist of a heater plate or frame 25a having an upstanding flange 26 forming a casing enclosed by a reflecting plate 30. A series of heating units 31 is disposed within the casing of the heater plate, whereby the pattern may be initially heated before the molding mixture is deposited thereupon. A plurality of stripper pins 32 are slidably disposed within the heater plate and reflector plate and are held in inactive position by means of stripper springs 33. Each heater plate is formed with a sleeve 34 which is non-rotatably fixed to a bearing housing 35. The bearing housing and the sleeve are rotatably mounted upon anti-friction bearings 40 carried by a pattern assembly stud 36. A detent 41 is carried by the housing and is engageable with detent recesses 42 formed in the stud at substantially 180° apart so as to temporarily hold the pattern assembly in either of its predetermined positions. Each of the studs 36 may be fastened in position within the turret head by any suitable means, not shown. The bearing housing is formed with an enlarged recess 43 in which is mounted the required number of collector rings 44 which are secured to the stud 36 and with which brushes 45, carried by the housing, are engageable. A bracket 46 carried by the flange 42 is rotatable with the housing, and wires attached to the brushes are supported by the bracket and extend to the heating units 31 and the control elements thereof (not shown).

Referring to Fig. 2, the molding unit comprises a casing 47 having a rotatably mounted yoke shaft 50 to the outer end of which is attached a roll-over yoke 51. The yoke shaft has a roll-over pinion 52 and a brake drum 53 secured thereto. A rack 54 is slidably mounted within the casing and is in mesh with said pinion. The rack is reciprocated by means of a hydraulic roll-over cylinder 55. The brake drum is provided with a brake band 56 surrounding the same and suitable hydraulic means in the form of a cylinder 60 serve to actuate the brake band.

The sand mixture flask 61 is carried preferably by two supporting arms 62 which extend rearwardly therefrom and which are slidably mounted upon two spaced guide rods 63 secured to the roll-over yoke 51, and actuated by a roll-over cylinder 64 carried by the yoke. The roll-over cylinder and brake cylinder are actuated in proper timed relation by suitable means (not shown). The sand mixture flask 61 is formed with an open mouth 65 surrounding which is a water cooling passage or jacket 66 to which cooling fluid is conducted by any suitable means (not shown). Arranged within the flask is a plurality of spaced baffle plates 71, 72, 73, 74 and 75 extending upwardly from the bottom thereof and inclined forwardly toward the direction of rotation of the flask. The baffles provide mixture compartments 77 and since they are of different lengths they serve to distribute the mixture into the compartments when the flask is moved from the molding position of Fig. 10 back to the initial position of Fig. 8. In order to further effect the desired distribution, the flask is moved to a position approximately 30° beyond the vertical position of Fig. 8, whereby the mixture will be more evenly divided between the compartments and thus be more uniformly spread over the pattern when the flask is again inverted. In order to more evenly distribute the sand in the flask between the compartments and to provide a more uniform volume control, the opposite sides of the flask which are parallel with each other are joined to the flask bottom by rounded surfaces of different radius as shown in Figs. 8 to 10. A screen 76 is stretched across the flask whereby sand mixture in the form of lumps which have not adhered to the mold will be prevented from returning to the mixture in the flask, and which may be conveniently removed from the screen before another mold is made. This screen may, if desired, be of the vibrating type.

The units at the various stations are so positioned that the pattern assemblies will be indexed to positions of registration therewith, where they will be held until the predetermined step of the shell molding process is completed. When one of the pattern assemblies is in the position shown in Fig. 2, the sand mixture flask is elevated and it is brought into sealing contact with the face of the pattern plate 70 as shown in Fig. 8. When so positioned the yoke will be actuated by the roll-over cylinder to rotate the pattern plate and sand flask to the upright position shown in Fig. 10, and the sand mixture will thereby be discharged onto the pattern from the compartments 77 of the sand flask. When the flask has reached the position of Fig. 10, sufficient sand mixture will have been uniformly deposited by vertical fall through the screen 76 upon the pattern to form the mold. Subsequent to the forming of the mold, the pattern assembly and sand flask are reversely rotated by the yoke, and the sand not used is returned to the flask through the screen 76. In order that the residue sand mixture be evenly distributed in the sand compartments 77, it is desirable that the sand box be rotated beyond the vertical position shown in Fig. 8 a substantial amount which may be approximately 30° as hereinbefore pointed out. This will cause the sand mixture to be spilled over the outer edges of the baffle plates 71 to 75 to give to each compartment the desired amount of sand mixture. After the sand box and associate pattern assembly has been moved beyond the vertical, they are then rotated back to the vertical position shown in Fig. 8 in which position the sand flask is moved away from the pattern assembly. When the roll-over yoke is moved from one position to another, it is quite essential that the inertia thereof be absorbed and that the yoke be interrupted in its movement. In order to accomplish this, the brake band 56 is automatically actuated at predetermined periods by the cylinder 60 which is controlled by automatic means not shown or described in this application.

Figure 4:
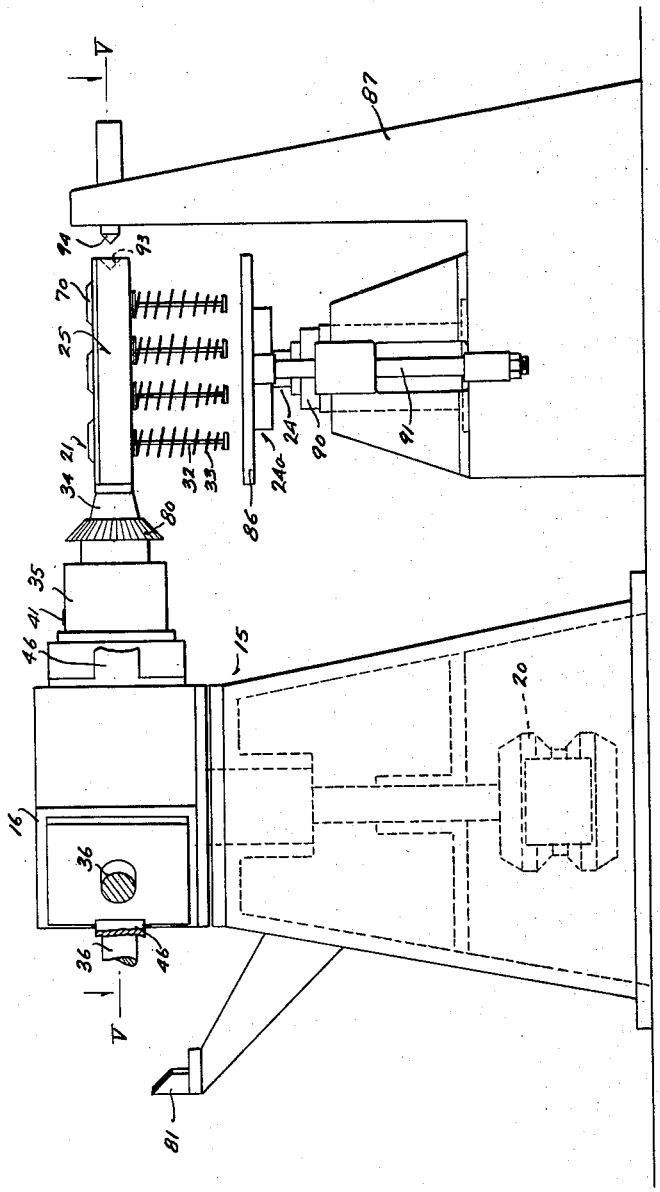
Fig. 4 is a similar view of the pattern assembly in the position occupied when at the stripping station.

The indexing means (not shown) is now actuated, and the pattern assembly with its shell mold is rotated by the turret head in clockwise direction as viewed in Fig. 1 to the curing station 23. However, in the movement of the pattern assembly from the molding station to the curing station and from the stripping station to the molding station, it is desirable to invert the pattern assembly to bring the pattern on top of the assembly. In order to accomplish this movement, a gear pinion 80 carried by each pattern assembly engages stationarily arranged segmental gears 81 and 82 carried by the pedestal 15, and these segments are so positioned that when the gear pinions 80 mesh therewith each segmental gear will cause the pattern assembly to be rotated upon its stud 36 through an angle of substantially 180°. The detents 41 will temporarily hold the pattern assemblies in either of the two active positions. Due to the engagement of the pinion 80 with the gear segment 81, the pattern assembly will be advanced to the curing station with the shell mold in upright position as shown in Fig. 3. The unit 23 at the curing station 23a, as shown in this figure, comprises a pivotally mounted arm 83 having a series of heating elements 84 extending downwardly toward the mold whereby heat is applied to cure the mold. The arm 83 of the curing unit is mounted for vertical adjustment upon a rotatable pedestal 85. The pedestal is rotatable by any suitable means, such, for instance, as a motor 86 shown in dotted lines in this figure. The purpose of the rotatable heating unit is that to control the curing period to any predetermined time, or if for any reason the predetermined sequential timing relation of movement from one station to another is interrupted or delayed, the heating unit will be rotated to an inactive position as shown by the dot-and-dash line position of Fig. 1, thereby preventing overcuring of the finished mold. The means for automatically actuating this heating means may be a standard thermostatically controlled device which is not herein shown or described, since it does not form a part of my invention. After the mold has been cured, it is advanced from the curing station to the stripping station with the molds still in an upright position. The unit 24 at the stripping station 24a is shown in Fig. 4 and comprises a stripping plate 86 which is movable vertically upon guide rods 91 by means of a stripping plate cylinder 90. The cylinder 90 and guide rods 91 are carried by a bracket 87. After stripping, the mold may be removed from the pattern assembly and the turret again actuated to advance the pattern assembly to the molding station. During movement of the pattern assembly from the stripping station to the molding station, the gear pinion 80 will contct the segmental gear 82 and rotate the assembly through an angle of substantially 180° and to an inverted position where it will be subsequently engaged by the molding flask when the latter is again actuated. Obviously, since there are three stations shown in the preferred form of the invention and three pattern assemblies, the steps of molding, curing and stripping may be simultaneously carried out.

In the molding and stripping positions, it is desirable to support the free end of the pattern assembly, and to this end, the yoke 51 is provided with hydraulically actuated supporting pins 92. Each of these pins is preferably cone shaped at its outer end for engagement with similarly formed recesses 93 formed in the heater plate. In like manner the bracket 87 of the stripping device is provided with two supporting pins 94 which engage the tapered recesses 93 of the heater plate when in the stripping position.

Arranged adjacent the device at the molding station is a sand mixture storage bin 94 which is provided with a chute 95 (see Figs. 1, 6 and 7). The storage bin is preferably provided with suitable means (not shown) which deliver the mixture to the chute 95. A unit charge hopper 96 is mounted at the outer end of a hopper arm 100 which is pivoted to the casing 47 of the molding unit. The storage bin is designed to deliver to the unit hopper a charge of sand mixture which will replenish the sand flask with an amount of mixture substantially equal to that which has been used in the formation of the shell mold. Each time a mold is prepared at the molding station and before the next pattern assembly has reached a position of registration with the flask, the unit charge hopper is actuated from its loading position shown in Figs. 1 and 6, to its dumping position shown in Fig. 7. The hopper is provided with a slide 101 which has a slide actuating arm 102 extending downwardly therefrom. As the unit hopper is moved from the position shown in Fig. 6 to that in Fig. 7, the actuating arm will engage the upper end of the sand flask 61 and push the slide to its open position, thereby dumping the unit contents into the sand flask. As the unit hopper is moved back to the loading position of Fig. 6, a helical spring 103 will serve to move the slide 101 to its closed position.

Instead of having but one curing station, it is obvious that the time of curing may be divided between two curing stations, and such a combination is shown in Fig. 11 where in diagrammatic manner 22 represents the molding station, 23 the first heating station, 27 the second heating station, and 24 the stripping station. By such an arrangement the curing time may be substantially reduced and production cycle proportionally shortened. While I have shown the two curing stations 23 and 27 as being in sequence for mold curing it is obvious that they may be rearranged with the stripping station positioned therebetween, whereby the curing station 27 may be used to heat the pattern surface before it reaches the next molding position.

Obviously, an arrangement using three or more heating units may be used for molding curing and pattern heating, such as that shown in Fig. 12 where two heating units are arranged for successive curing of a mold and where a heating unit 28 is located between the stripping station 24 and the molding station 22. Furthemore, while I have shown three pattern assemblies as the preferred form of the invention, it is obvious that a more or less number of pattern assemblies may be used in carrying out my invention.

What is claimed is:

1. A machine for making shell molds, comprising a turret head having its axis in a vertical plane, a reversible pattern assembly rotatably carried by said turret head and being periodically movable thereby in a horizontal plane in sequence to a number of fixed operating stations, a pattern carried by said assembly, said stations being independent of said pattern assembly and being arranged substantially equidistantly about said turret head, said stations consisting of a molding station, a curing station, and a stripping station, a molding device at the molding station, comprising a roll-over yoke independent of said turret head and having a stationary axis of oscillation in the plane of the horizontal path which will be coincident with the pattern assembly axis of rotation when in molding position, a sand flask slidably carried by said yoke and containing a charge of sand mixture, means for moving said flask into sealing contact with the registering pattern assembly when in arrested position, means for periodically rotating said yoke and coacting pattern assembly as a unit when in the arrested molding position to a position to discharge the sand mixture onto said pattern, means to reverse the position of the coacting pattern assembly and sand flask unit to return surplus sand mixture to said flask, a heating device located at said curing station, a stripping device located at said strippping station, and means for moving the turret to bring the pattern assemblies successively to the curing station and stripping station after the operation of said reversing means.

2. A machine for making shell molds, comprising a turret head having its axis in a vertical plane, a reversible pattern assembly rotatably carried by said turret head and being periodically movable thereby in a horizontal plane in sequence to a number of fixed operating stations, a pattern carried by said assembly, said stations being independent of said pattern assembly and being arranged substantially equidistantly about said turret head, said stations consisting of a molding station, a curing station, and a stripping station, a molding device at the molding station, comprising a stationary casing, a roll-over yoke carried by said casing independently of said turret, a single sand flask slidably carried by said yoke and containing a charge of sand mixture, means for moving said flask into sealing relation with the registering pattern assembly, means for periodically rotating said yoke and coacting pattern assembly as a unit when in arrested molding position to a position to discharge the sand mixture onto said pattern, means to reverse the position of the coacting pattern assembly and sand flask unit to return surplus sand mixture to said flask, a heating device located at said curing station, a stripping device located at said stripping station, and means for moving the turret to bring the pattern assemblies successively to the curing station and stripping station after the operation of said reversing means.

3. A machine for making shell molds, comprising a turret head having its axis in a vertical plane, a reversible pattern assembly rotatably carried by said turret head and being periodically movable thereby in a horizontal plane in sequence to a number of fixed operating stations, a pattern carried by said assembly, said stations being independent of said pattern assembly and being arranged substantially equidistantly about said turret head, said stations consisting of a molding station, a curing station and a stripping station, a molding device at the molding station, comprising a stationary casing, a roll-over yoke carried by said casing independently of said turret, a single sand flask slidably carried by said yoke and containing a charge of sand mixture, means for moving said flask into sealing relation with the registering pattern assembly, means for periodically rotating said yoke and coacting pattern assembly as a unit when in arrested molding position to a position to discharge the sand mixture onto said pattern, means to reverse the position of the coacting pattern assembly and sand flask unit to return surplus sand mixture to said flask, a pivotally mounted heating unit located at the mold curing station, means for oscillating said heating unit, and a stripping device located at said stripping station.

4. A machine for making shell molds, comprising a turret head having its axis in a vertical plane, a reversible pattern assembly rotatably carried by said turret head and being periodically movable thereby in a horizontal plane in sequence to a number of fixed operating stations, a pattern carried by said assembly, said stations being independent of said pattern assembly and being arranged substantially equidistantly about said turret head, said stations consisting of a molding station, a curing station, and a stripping station, a molding device at the molding station, comprising a roll-over yoke independent of said turret head and having a stationary axis of oscillation in the plane of the horizontal path which will be coincident with the pattern assembly axis of rotation when in molding position, a sand flask slidably carried by said yoke and containing a charge of sand mixture means for moving said flask into sealing contact with the registering pattern assembly when in arrested position, means for periodically rotating said yoke and coacting pattern assembly as a unit when in the arrested molding position to a position to discharge the sand mixture onto said pattern, means to reverse the position of the coacting pattern assembly and sand flask unit to return surplus sand mixture to said flask, a heating device located at said curing station, and means interposed between the molding station and the curing station and operable to invert the pattern assembly prior to entering the curing station.

5. A machine for making shell molds, comprising a turret head having its axis in a vertical plane, a reversible pattern assembly rotatably carried by said turret head and being periodically movable thereby in a horizontal plane in sequence to a number of fixed operating stations, a pattern carried by said assembly, said stations being independent of said pattern assembly and being arranged substantially equidistantly about said turret head, said stations consisting of a molding station, a curing station, and a stripping station, a molding device at the molding station, comprising a roll-over yoke independent of said turret head and having a stationary axis of oscillation in the plane of the horizontal path which will be coincident with the pattern assembly axis of rotation when in molding position, a sand flask slidably carried by said yoke and containing a charge of sand mixture, means for moving said flask into sealing contact with the registering pattern assembly when in arrested position, means for periodically rotating said yoke and coacting pattern assembly as a unit when in the arrested molding position to a position to discharge the sand mixture onto said pattern, means to reverse the position of the coacting pattern assembly and sand flask unit to return surplus sand mixture to said flask, a heating device located at said curing station, and means interposed between the stripping station and the molding station for restoring the pattern assembly for the next operative contact with said sand flask.

6. A machine for making shell molds comprising a roll-over yoke, a fixed pivotal support for said yoke, a reversible pattern assembly having a pattern support, a pattern carried by said support, a sand flask slidably carried by said yoke and movable in a path normal to the axis of rotation of said yoke, said flask being movable into sealing contact with a registering pattern assembly when in arrested position, means for actuating said sand flask, and means for periodically actuating said yoke to invert said sand flask and the coacting pattern support from its initial position to discharge sand mixture onto the pattern, and means for reinverting said yoke to move said sand flask substantially 30° beyond its initial vertical position and subsequently returning it to the said initial position.

7. A machine for making shell molds, comprising a roll-over yoke, a fixed pivotal support for said yoke, a sand flask carried by said yoke and movable in a path normal to the axis thereof, an inboard bearing housing mounted adjacent said yoke in off-set relation therewith, a pattern assembly reversibly mounted in said bearing housing and extending over and in spaced relation with said flask for registration therewith, said pattern assembly having a pattern support and being movable in a horizontal plane into and out of registration with said flask, a pattern carried by said pattern support, means for vertically moving said flask into sealing relation with the registering pattern assembly when in arrested position, and means for actuating said yoke to invert said flask and said coacting pattern assembly to discharge said mixture onto said pattern and to return said flask and said pattern assembly to their initial positions.

8. A machine for making shell molds, comprising a turret head having its axis in a vertical plane, a reversible pattern assembly rotatably carried by said turret head and being periodically movable thereby in a horizontal plane in sequence to a number of fixed operating stations, a pattern carried by said assembly, said stations being independent of said pattern assembly and being arranged substantially equidistantly about said turret head, said stations consisting of a molding station, a curing station, and a stripping station, a molding device at the molding station, comprising a roll-over yoke independent of said turret head and having a stationary axis of oscillation in the plane of the horizontal path which will be coincident with the pattern assembly axis of rotation when in molding position, a sand flask slidably carried by said yoke and containing a charge of sand mixture, means for moving said flask into sealing contact with the registering pattern assembly when in arrested position, means for periodically rotating said yoke and coacting pattern assembly as a unit when in the arrested molding position to a position to discharge the sand mixture onto said pattern, means to reverse the position of the coacting pattern assembly and sand flask unit to return surplus sand mixture to said flask, a heating device located at said curing station, a stripping device located at said stripping station, means for moving the turret to bring the pattern assemblies successively to the curing station and stripping station after the operation of said reversing means, and means for reinverting said yoke to move said sand flask substantially 30° beyond its initial vertical position and subsequently returning it to said initial position.

9. A machine for making shell molds, comprising a turret head having its axis in a vertical plane, a reversible pattern assembly rotatably carried by said turret head and being periodically movable thereby in a horizontal plane in sequence to a number of fixed operating stations, a pattern carried by said assembly, said stations being independent of said pattern assembly and being arranged substantially equidistantly about said turret head, said stations consisting of a molding station, a curing station, and a stripping station, a molding device at the molding station, comprising a roll-over yoke independent of said turret head and having a stationary axis of oscillation in the plane of the horizontal path which will be coincident with the pattern assembly axis of rotation when in molding position, a sand flask slidably carried by said yoke and containing a charge of sand mixture, unit hopper means associated with said flask for maintaining a substantially uniform charge of sand mixture in said flask, means for moving said flask into sealing contact with the registering pattern assembly when in arrested position, means for periodically rotating said yoke and coacting pattern assembly as a unit when in the arrested molding position to a position to discharge the sand mixture onto said pattern, means to reverse the position of the coacting pattern assembly and sand flask unit to return surplus sand mixture to said flask, a heating device located at said curing station, a stripping device located at said stripping station, and means for moving the turret to bring the pattern assemblies successively to the curing station and stripping station after the operation of said reversing means.

10. A machine for making shell molds, comprising a turret head having its axis in a vertical plane, a reversible pattern assembly rotatably carried by said turret head and being periodically movable thereby in a horizontal plane in sequence to a number of fixed operating stations, a pattern carried by said assembly, said stations being independent of said pattern assembly and being arranged substantially equidistantly about said turret head, said stations consisting of a molding station, a curing station, and a stripping station, a molding device at the molding station, comprising a roll-over yoke independent of said turret head and having a stationary axis of oscillation in the plane of the horizontal path which will be coincident with the pattern assembly axis of rotation when in molding position, a sand flask slidably carried by said yoke and containing a charge of sand mixture, a sand mixture storage bin, unit hopper means movable between said storage bin and said flask for maintaining a substantially uniform charge of sand mixture in said flask, means for moving said flask into sealing contact with the registering pattern assembly when in arrested position, means for periodically rotating said yoke and coacting pattern assembly as a unit when in the arrested molding position to a position to discharge the sand mixture onto said pattern, means to reverse the position of the coacting pattern assembly and sand flask unit to return surplus sand mixture to said flask, a heating device located at said curing station, a stripping device located at said stripping station, and means for moving the turret to bring the pattern assemblies successively to the curing station and stripping station after the operation of said reversing means.

11. A machine for making shell molds, comprising a turret head having its axis in a vertical plane, a reversible pattern assembly rotatably carried by said turret head and being periodically movable thereby in a horizontal plane in sequence to a number of fixed operating stations, a pattern carried by said assembly, said stations being independent of said pattern assembly and being arranged substantially equidistantly about said turret head, said stations consisting of a molding station, a curing station, and a stripping station, a molding device at the molding station, comprising a roll-over yoke independent of said turret head and having a stationary axis of oscillation in the plane of the horizontal path which will be coincident with the pattern assembly axis of rotation when in molding position, a sand flask slidably carried by said yoke and containing a charge of sand mixture, a sand mixture storage bin, unit hopper means movable between said storage bin and said flask for maintaining a substantially uniform charge of sand mixture in said flask, means for moving said flask into sealing contact with the registering pattern assembly when in arrested position, means for periodically rotating said yoke and coacting pattern assembly as a unit when in the arrested molding position to a position to discharge the sand mixture onto said pattern, means to reverse the position of the coacting pattern assembly and sand flask unit to return surplus sand mixture to said flask, a heating device located at said curing station, a stripping device located at said stripping station, means for moving the turret to bring the pattern assemblies successively to the curing station and stripping station after the operation of said reversing means, means for moving said heating device toward and from the registering pattern assembly, and a stripping device located at said stripping station.

12. A machine for making shell molds, comprising a movable support, a pattern assembly rotatably carried by said support and periodically movable thereby in a path in sequence to a number of operating stations, a pattern carried by said assembly, said stations consisting of a molding station, a curing station, and stripping station, a molding device at the molding station comprising a roll-over yoke independent of said support and having an axis of rotary movement lying in the plane of the path of said pattern assembly, the latter being movable to a molding position in which its axis of rotation is coincident with the axis of rotation of said yoke, arresting means operable to arrest the support when the assembly and yoke are coaxially related, a sand flask slidably carried by said yoke and movable upwardly thereon into operative contact with the pattern assembly when in arrested position, means rotating said coaxially related yoke and coacting pattern assembly as a unit when arrested to an inverted position to discharge its sand mixture onto said pattern, and means to restore the unit to its starting position to return surplus sand mixture to said flask.

13. A machine for making shell molds, comprising a movable support, a pattern assembly rotatably carried by said support and periodically movable thereby in a path in sequence to a number of operating stations, a pattern carried by said assembly, said stations consisting of a molding station, a curing station, and a stripping station, a molding device at the molding station comprising a roll-over yoke independent of said support and having an axis of rotary movement lying in the plane of the path of said pattern assembly, the latter being movable to a molding position in which its axis of rotation is coincident with the axis of rotation of said yoke, arresting means operable to arrest the support when the assembly and yoke are coaxially related, a sand flask slidably carried by said yoke and movable upwardly thereon into operative contact with the pattern assembly when in arrested position, means rotating said coaxially related yoke and coacting pattern assembly as a unit when arrested to an inverted position to discharge its sand mixture onto said pattern, means to restore the unit to its starting position to return surplus sand mixture to said flask, a heating device located at said curing station, a stripping device located at said stripping station, and means for moving the support to bring the pattern assembly successively to the curing station and stripping station following the operation of said restoring means.

References Cited in the file of this patent
UNITED STATES PATENTS

| | | |
|---|---|---|
| 2,659,944 | Valyi | Nov. 24, 1953 |
| 2,659,945 | Valyi | Nov. 24, 1953 |
| 2,695,431 | Davis | Nov. 30, 1954 |
| 2,746,104 | Valyi | May 22, 1946 |

OTHER REFERENCES

Foundry, November 1952, page 265.